United States Patent [19]

Larsen

[11] Patent Number: 5,177,977

[45] Date of Patent: Jan. 12, 1993

[54] SOLAR ENERGY COLLECTOR AND RERADIATION APPARATUS FOR LOCALIZED CLIMATE CONTROL

[76] Inventor: Theodore E. Larsen, 7774 Lochmere Ter., Edina, Minn. 55435

[21] Appl. No.: 758,467

[22] Filed: Sep. 6, 1991

Related U.S. Application Data

[63] Continuation of Ser. No. 453,075, Dec. 19, 1989, abandoned, which is a continuation of Ser. No. 336,466, Apr. 11, 1989, abandoned.

[51] Int. Cl.⁵ .............................................. F25B 27/00
[52] U.S. Cl. ................................. 62/235.1; 62/324.1; 62/238.6; 126/684
[58] Field of Search ............ 237/2 B; 62/235.1, 324.1, 62/238.6; 126/427, 429, 419, 438

[56] References Cited

U.S. PATENT DOCUMENTS

| 402,357 | 4/1889 | Shackelton . | |
|---|---|---|---|
| 3,262,493 | 7/1966 | Hervey | 126/428 X |
| 3,383,902 | 5/1968 | Cragin et al. . | |
| 4,334,521 | 6/1982 | Jacoby | 126/420 X |
| 4,461,277 | 7/1984 | Pardo . | |
| 4,596,935 | 6/1986 | Lumpp . | |
| 4,712,734 | 12/1987 | Johnson . | |
| 4,798,056 | 1/1989 | Franklin | 62/235.1 |

Primary Examiner—Henry A. Bennet

Attorney, Agent, or Firm—Merchant Gould Smith Edell Welter & Schmidt

[57] ABSTRACT

A solar energy collector and reradiation apparatus and method for use in energy production and localized climate control includes structure for storing energy; structure for concentrating solar radiation into a collection domain and structure for transferring energy from the collection domain to the storing structure. The apparatus also includes structure for radiating energy skywardly; structure for transmitting energy from the storing structure to the radiating structure; and optionally structure for extracting energy from the environment; structure for utilizing energy extracted from the storing means to elevate the temperature of the fluid carrying energy extracted from the environment, whereby environmental heat may be reradiated into space at a higher rate and at wavelengths less likely to be absorbed by the atmosphere than would naturally occur, thus permitting localized cooling and climate control. The invention provides a built-in economic incentive to potential developers, because it encompasses proven technology for the collection of solar energy and is thus capable of doubling as a solar energy source for commercial, residential and industrial applications. The invention has particular utility for solving the global warming that is presently occurring due to such gases as carbon dioxide in the atmosphere, both locally and on a global scale.

19 Claims, 9 Drawing Sheets

SOLAR ENERGY COLLECTOR AND RERADIATION APPARATUS FOR LOCALIZED CLIMATE CONTROL

This is a continuation of application Ser. No. 07/453,075, filed Dec. 19, 1989, now abandoned which is a CIP of Ser. No. 07/336,466 now abandoned.

BACKGROUND OF THE INVENTION

1. Field of the Invention

This invention relates to the problem of global temperature rise resulting from heat being trapped within the atmosphere by certain gases and vapors occurring naturally as well as by man-made pollutants, e.g., the so-called greenhouse effect. More specifically, the invention relates to an apparatus and method for radiating a greater amount of thermal energy from the earth into space then would naturally occur, thus providing localized cooling and possible climate control.

2. Description of the Prior Art

In the opinion of a majority of scientists in this country and around the world, the earth is experiencing a global atmospheric warming due to the ever increasing concentrations of certain naturally occurring gases and manmade pollutants in the atmosphere. Since the industrial revolution, the accelerated burning of fossil fuels in the industrialized nations has resulted in the release of a number of radiation absorbing pollutants into the atmosphere, among them methane ($CH_4$), carbon dioxide ($CO_2$), nitric oxide (NO), and sulphur dioxide ($SO_2$). In addition, a number of radiation absorbing man-made pollutants have been released into the atmosphere during the past century. A broad range of chlorinated fluorocarbons (CFC's) are involved, principally the family of Freon gases.

Figure 1:
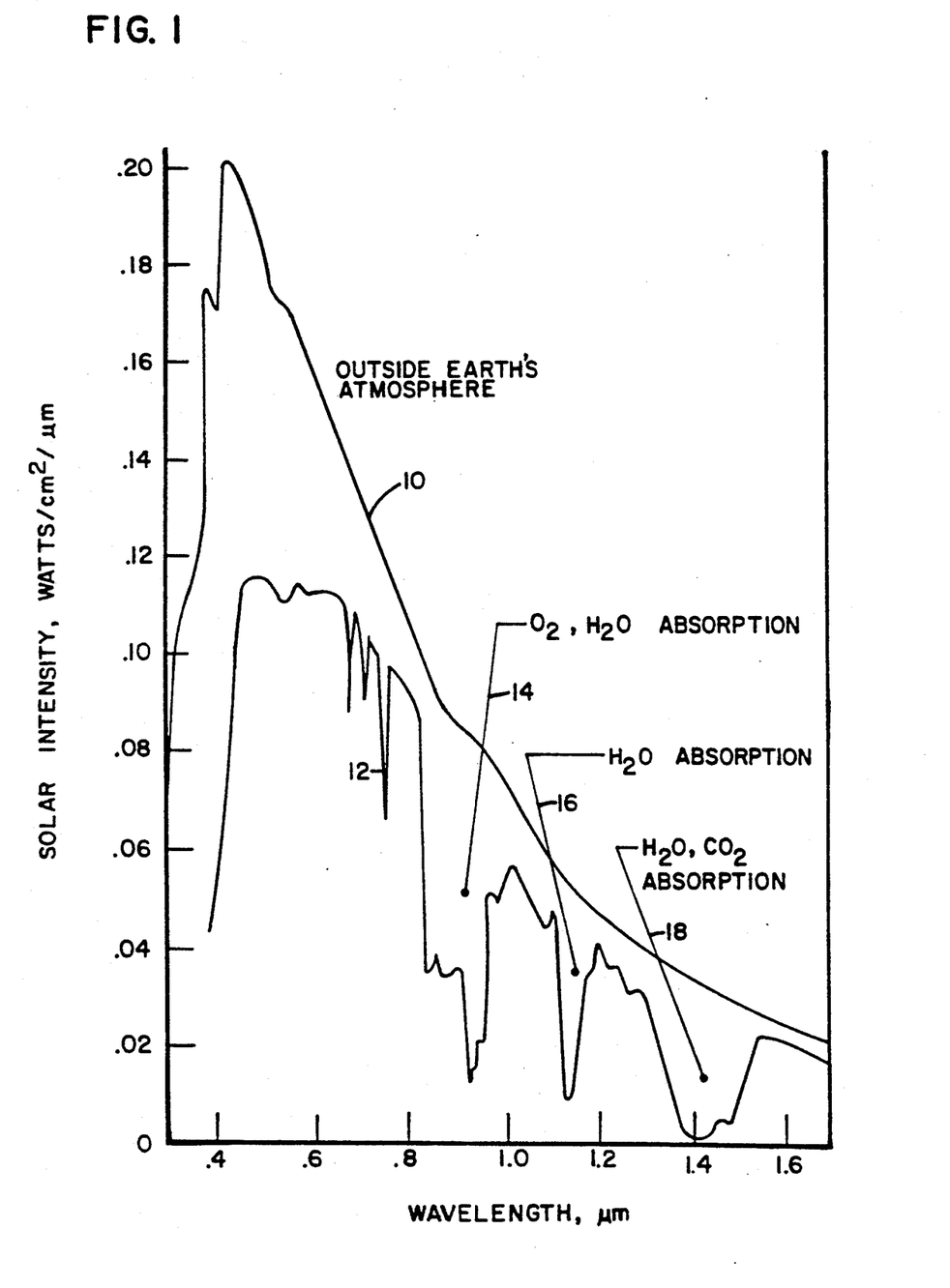
FIG. 1 is a graph depicting variation of solar intensity with wavelength of radiation for sunlight outside the earth's atmosphere and for a typical spectrum at the surface of the earth.

When solar radiation is intercepted by the earth, a certain amount of incoming radiation is absorbed by the atmosphere. FIG. 1 depicts the variation of solar intensity versus wave length for radiation outside the earth's atmosphere and for a typical spectrum at the surface of the earth. Curve 10 represents solar intensity outside the atmosphere, while curve 12 depicts the same at the surface of the earth. A comparison of curves 10, 12 will demonstrate that a substantial amount of radiation absorption occurs within the earth's atmosphere. On a global basis, the amount of solar radiation incident on the earth's atmosphere is about twice the amount that reaches the earth's surface A few naturally occurring instances of absorption include a region 14 between the 0.8-1.0 $\mu$m range, which is attributable to oxygen and water vapor, a region 16 in the 1.0-1.2 $\mu$m range and attributable to water vapor, and a third region 18 in the 1.3-1.5 $\mu$m range, which is attributable to water vapor and carbon dioxide.

As may be seen in FIG. 1, the sun transmits energy to earth at wave lengths principally in the 0.3-1.0 micrometer region. The radiation which reaches the surface of the earth provides energy for life processes, then ends up as relatively low temperature heat in the environment. The average amount of heat received from the sun on an annual basis must be reradiated to space, or the temperature of the earth will increase. However, once the relatively short wavelength solar energy is absorbed by the environment (air, land and water), it resides at environmental temperatures, and this changes the wavelengths at which it will be reradiated.

Figure 2:
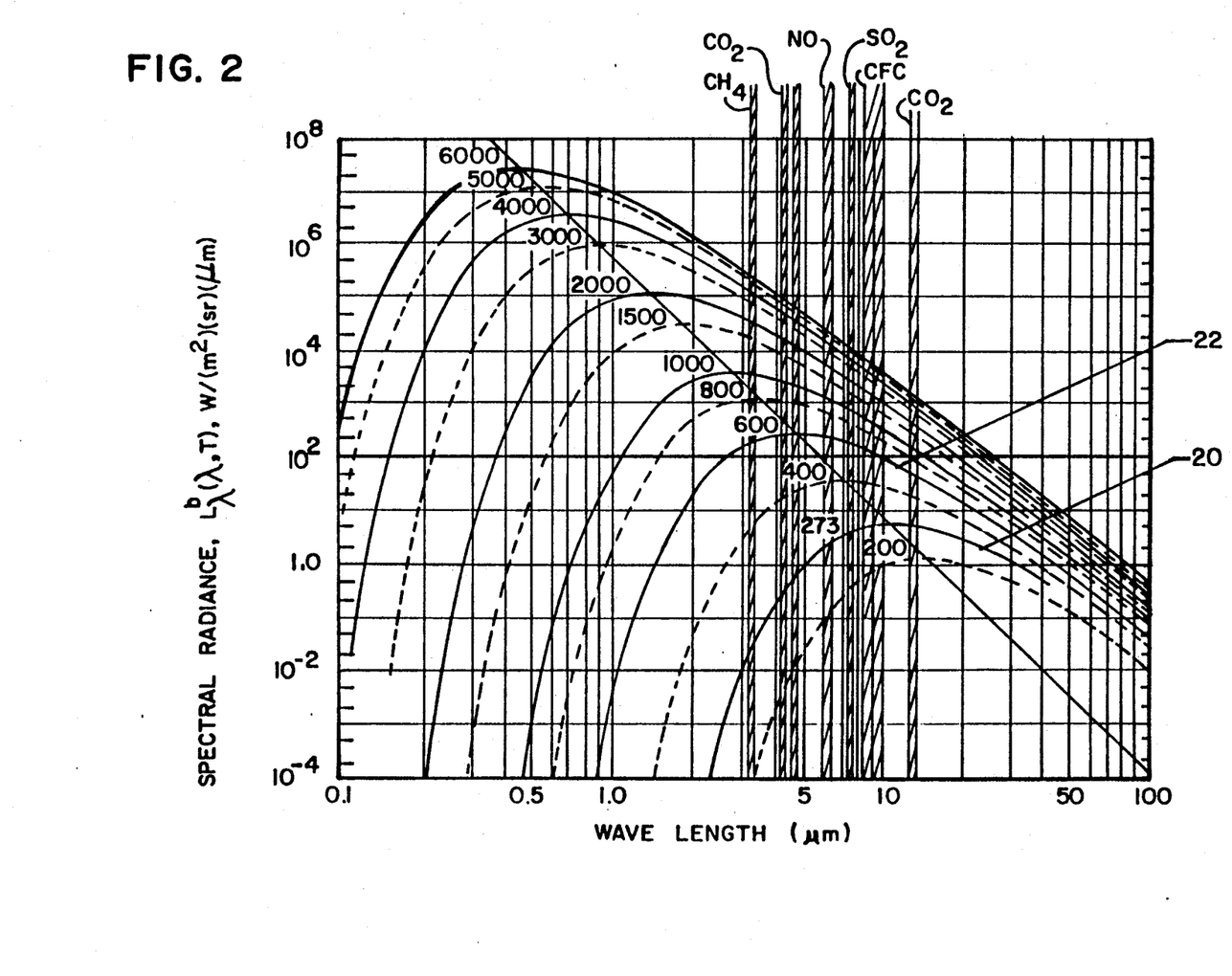
FIG. 2 is a graph depicting spectral radiance versus wavelength plotted on logarithmic scales, for a number of black body radiation curves for black bodies having absolute temperatures of 200° K. to 6,000° K.

FIG. 2 is a representation of spectral radiance versus wavelength, plotted on logarithmic scales, for black body radiators at a number of different temperatures ranging from 200° K. to 6,000° K. Superimposed upon the curves in FIG. 2 are bands depicting the characteristic ranges of absorption for the various gases and pollutants discussed above. Curve 20 in FIG. 2 depicts black body radiation at a temperature of 273° K. (32° F.), which is adequately close to a representation of the average temperature of the earth on an annual basis. As may be seen from curve 20, the environment has radiation frequencies which are centered in the mid infra-red. Herein lies the cause of the greenhouse effect, because the absorption bands for gases such as carbon dioxide, methane and others lie in the same region. Less than 10% of the solar radiation that reaches the earth's surface can be directly reradiated to space through the transmission bands shown on FIG. 3. The balance is part of a complex and continuous exchange of heat between the earth's surface and it's atmosphere, which is characterized by a net outflow of heat by indirect radiation to space.

Various solutions have been proposed for solving the problem of global warming due to the greenhouse effect on a global basis, but their feasibility on either an economic or political basis is questionable. For example, the amount of carbon dioxide released into the atmosphere could be sharply reduced by adoption of a proposal to stop the burning of fossil fuels such as oil and coal. The difficulty with this is that the world is heavily dependent on fossil fuels, and any sudden changes in energy consumption patterns would seriously disrupt the economies of virtually every nation. A second proposal has called for the deployment of satellites in space having large reflective surfaces to serve as artificial clouds. Besides the rather significant cost of such an approach, it would block out sunlight and have the effect of reducing the evaporation of water, which is necessary to produce rain. It has also been suggested that satellites be deployed having fields of cells for converting solar energy to electricity, and that energy so produced be transmitted to earth's surface via microwave radiation. Disadvantages of this approach are the significant cost of the equipment involved, and the probable logistic difficulties and ecological harm that would result from the transmission of large amounts of microwave energy through the atmosphere.

One common element of all of the proposed solutions mentioned above is the global nature of the undertaking involved, implicit in which are serious economic and political impediments to immediate implementation. It is clear that there has existed a long and unfilled need in the prior art for an apparatus and method for providing localized climate control which operates by increasing the amount of heat that is directly radiated to space from the earth's surface, provides a built-in economic incentive to produce and utilize, is relatively inexpensive, is harmless to the environment, and is expandable from localized to global proportions.

SUMMARY OF THE INVENTION

Accordingly, it is an object of the invention to provide an apparatus for localized cooling and climate control which increases the amount of heat that is directly radiated to space from the earth's surface, is relatively inexpensive to construct and is harmless to the environment.

A further object of the invention is to provide an apparatus for localized cooling and climate control which provides an additional economic incentive for its construction and deployment, such as the ability to convert solar energy into commercially usable electricity or process heat.

In order to achieve these and other objects of the invention, a solar energy collector and reradiation apparatus for use in energy production and climate control includes structure for storing energy; structure for concentrating solar radiation into a collection domain; structure for transferring energy from the collection domain to the storing structure; structure for transmitting energy from the storing structure to the radiating structure; structure for extracting heat from the environment; structure for transmitting energy extracted from the environment to the radiating structure; and structure for radiating energy skywardly, whereby energy may be reradiated into space at a higher rate and at wavelengths less likely to be absorbed by the atmosphere then would naturally occur, thus permitting localized cooling and climate control.

According to a second aspect of the invention, a method for collecting and reradiating solar energy for purposes of energy production and localized climate control includes the steps of concentrating solar radiation into a collection domain; transferring energy from the collection domain to a storing structure; transmitting energy from the storing structure to a radiating structure; and radiating the transmitted energy skywardly, whereby energy is reradiated into space at a higher rate and at wavelengths less absorbed by certain gases in the atmosphere than would naturally occur, thus permitting localized cooling and climate control.

These and various other advantages and features of novelty which characterize the invention are pointed out with particularity in the claims annexed hereto and forming a part hereof. However, for a better understanding of the invention, its advantages, and the objects obtained by its uses, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 3:
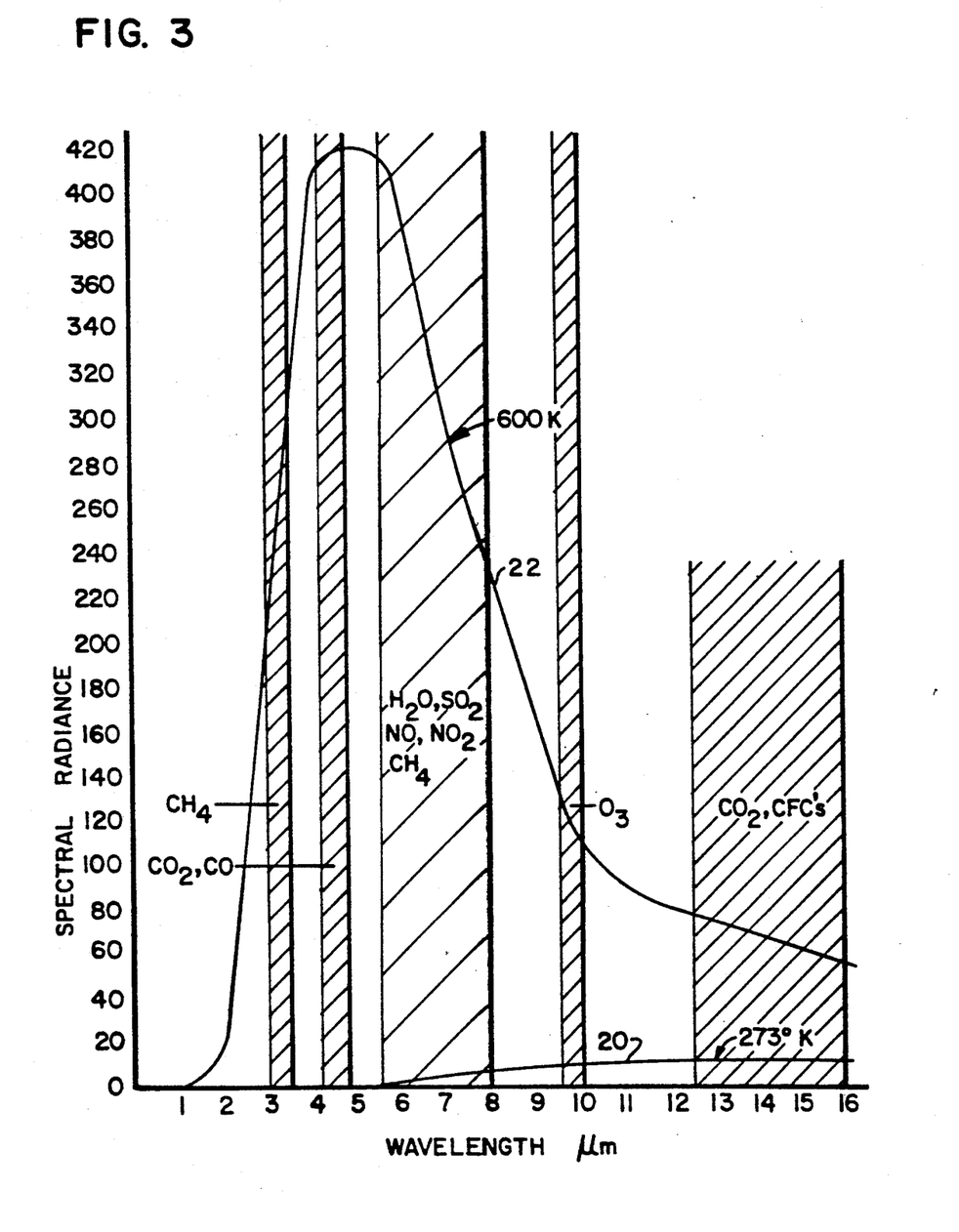
FIG. 3 is a graph depicting spectral radiance versus wavelength, plotted on linear scales, for two of the black body radiation curves previously shown in FIG. 2.

Referring now to the drawings, wherein like reference numerals designate corresponding structure throughout the views, and referring in particular to FIGS. 2 and 3, a curve 22 illustrates the black body radiation characteristics of an object at an absolute temperature of 600° K. As was stated previously, curve 20 depicts the black body radiation characteristics of an object at 273° K., which corresponds to 32° F. In FIG. 3, the curves 20, 22 have been plotted on linear axes for the purpose of comparison. Curve 20 is adequately close to a representation of the average temperature of the earth on an annual basis, and curve 22 is adequately close to the radiation from a real world body at 600° F. In both cases, the words "adequately close" take into account the fact that the real world consists of gray body radiators, which do not conform precisely with the theoretical representations based on perfect black bodies.

According to a fundamental premise of the invention, if energy could be radiated from the earth from a higher temperature source than the average temperature of the earth, it would travel at wavelengths that are not as strongly impacted by the greenhouse gases. The area under each curve 20, 22 in FIG. 3 represents radiating capability for objects at those temperatures, and the percentage of area that lies in the carbon dioxide bands is substantially less for the 600° K. source than for the 273° K. source. According to the invention, the concept of reradiating energy at wavelengths shorter than those available from the relatively cool earth involves using a higher temperature fluid to provide a carrier wavelength. Such a high temperature fluid is obtained by using a solar radiation concentrating structure which heats the fluid, and a high temperature fluid storage tank for storing the heated fluid. One arrangement of this type would enable the collection and storage of solar heat at about 600° F. using a parabolic line concentrating structure, and during the extended periods that global intake and reradiation of heat are in balance, these concentrators would be used by industry as sources of process heat. When, either locally or globally, more solar heat has accumulated than can be dissipated, the unwanted excess energy can be reradiated into space using the same basic structure involved in the solar heat collection process. This is achieved by imposing the energy of stored solar heat on a lower temperature fluid used to extract environmental heat, thus elevating its temperature and causing the energy gathered from the environment to assume radiation frequencies characteristic of the higher temperature fluid. Because the arrangement functions as a solar energy source in addition to its local or global environmental cooling capabilities, it provides an additional economic incentive for deployment which does not exist in other proposed solutions to the greenhouse effect. The fundamental premise of the invention applies as well to other concentrator types, including but not limited to those constructed as parabolic point focus (dish type) concentrators and curved or flat plate heliostats. For purposes of simplicity, however, descriptions herein are directed to the parabolic line (trough type) concentrating structures.

Figure 4:
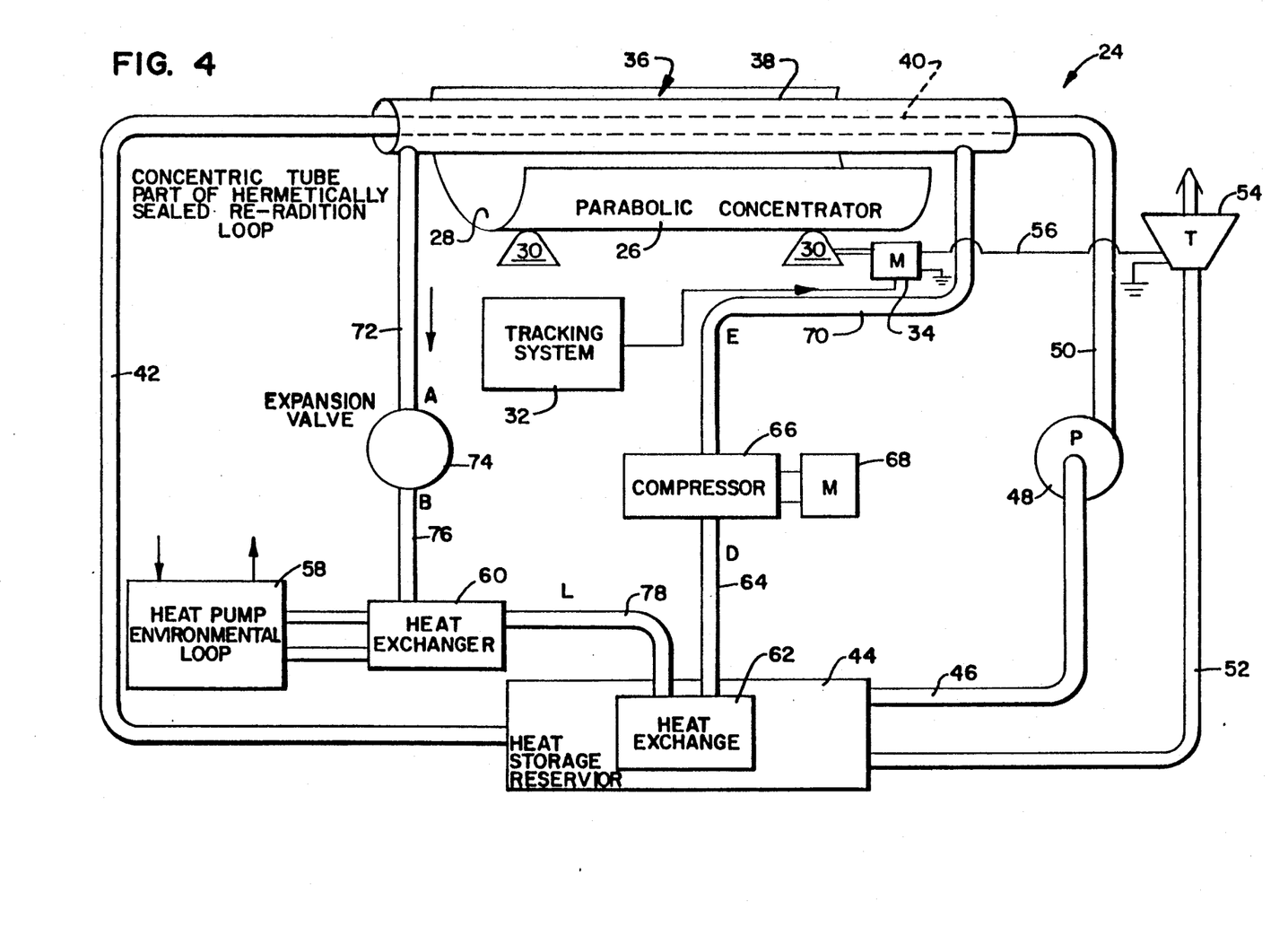
FIG. 4 is a schematic diagram depicting a solar energy collector and reradiation apparatus constructed according to a first embodiment of the invention.

Referring now to FIG. 4, a reradiation system 24 constructed according to a first embodiment of the invention includes a parabolic concentrator 26 having a concave inner reflecting surface 28 and a pivotal mounting arrangement 30. Concentrator 26 and reflective surface 28 are formed so as to direct solar radiation incident thereon into a linearly extending collection domain for purposes which will be described in further detail below. A tracking system 32 may be provided for moving the concentrator in response to solar position in order that the amount of solar radiation incident upon concentrator 26 be maximized. This is usually accomplished by keeping the concentrator pointed toward the azimuth of the sun. Tracking system 32 is of conventional design and hence is shown schematically in block form only. The tracking system 32 controls a motor 34 which is connected via a standard force transmission arrangement to pivot concentrator 26 about its pivotal mounts 30.

A circuit for transferring energy from the collection domain defined within concentrator 26 to a heat storage facility includes a radiation collector tube 36 having, in one configuration, an outer tube 38 and an internal tube 40. Tube 36 is preferably formed of a metallic material having a dark coating so as to simulate a black body radiator as much as possible. A first end of collector tube 40 is connected to a first collector pipe 42 which in turn leads to a heat storage reservoir 44, which in the preferred embodiment is an insulated high temperature storage tank. A second collector pipe 46 leads from heat storage reservoir 44 to a pump 48. The function of pump 48 is to draw fluid from heat storage reservoir 44 through second collector pipe 46 and to circulate the fluid through collector tube 40 via a third collector pipe 50. In this way, circulation is achieved throughout the entire energy transferring circuit, and solar energy is gradually converted into high temperature thermal energy which is stored in reservoir 44.

A turbine generator 54 or other power conversion arrangement is connected to heat storage reservoir 44 via a turbine supply pipe 52, as is shown in FIG. 4. Electricity provided by the turbine generator 54 is used to power the tracking motor 34, the pump 48, compressor motor 68, heat pump motor 58, and may additionally supply process energy for industrial, commercial or home use when it is not deemed necessary to reradiate energy back into space. An electric wire 56 is used to convey electricity from turbine 54 to the various motors, as is shown in FIG. 4.

In order to permit radiation of environmental heat back into space, an energy transmitting circuit includes a heat pump 58 which is used to add environmental heat to a thermal transfer medium with the energy transmitting circuit, via a heat exchanger 60. A second heat exchanger 62 is provided within heat storage reservoir 44 for transferring thermal energy between the energy transmitting circuit and heat storage reservoir 44.

In the embodiment illustrated in FIG. 4, a compressor 66 is coupled to a motor 68 for compressing a thermal transfer medium which is drawn through heat exchanger 62 via a first radiator pipe 64. The compressed thermal transfer medium is supplied through a second radiator pipe 70 into outer tube 38. A third radiator pipe 72 is connected on an opposite end of tube 38, and leads to an expansion valve 74 which permits the thermal transfer medium to expand and absorb environmental heat. A fourth radiator pipe 76 connects expansion valve 74 to heat exchanger 60, through which the thermal transfer medium passes before traveling to heat exchanger 62 via a fifth radiator pipe 78.

The thermal transfer medium may be a commercial refrigerant such as propane, which would circulate as a liquid, as a wet vapor and as a dry vapor. Alternatively, a wide range of different refrigerants could conceivably used, including water. The energy transmitting circuit is preferably hermetically sealed, and the pressure and heat addition stations are preferably optimized so that the temperature of the medium passing through tube 38 can be held, at least theoretically, constant, so that the entire reflector structure is fully utilized for reradiation of energy at optimum efficiency.

Figure 5:
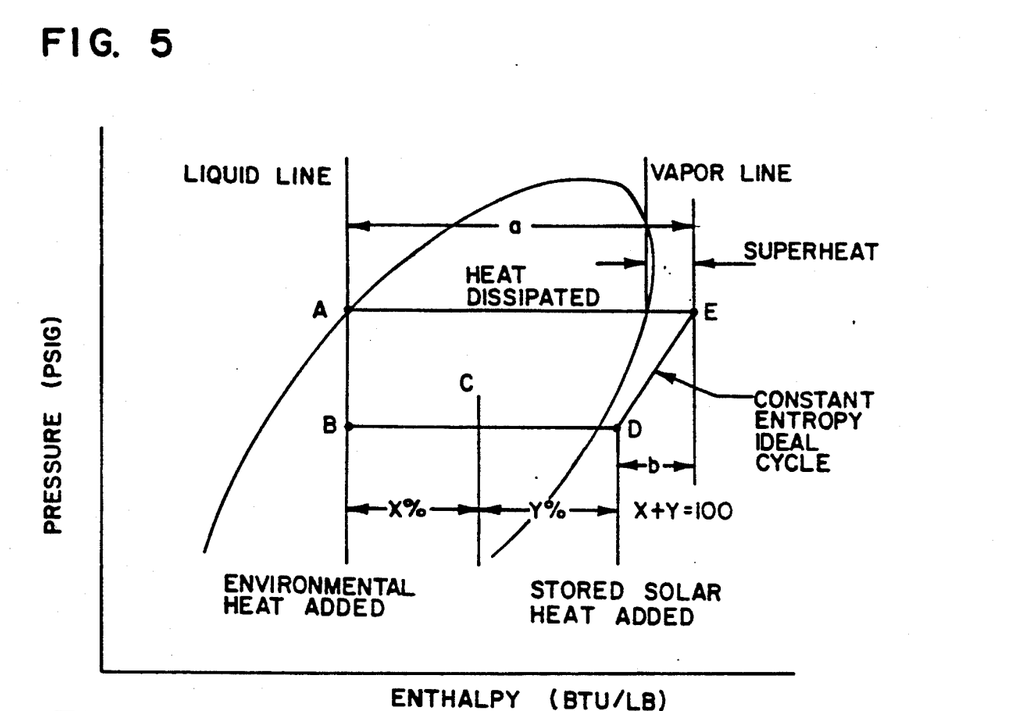
FIG. 5 is a pressure-enthalpy diagram for the thermal transfer medium used in the embodiment of FIG. 4.

Referring now to FIG. 5, the thermodynamic cycle of the thermal transfer medium used in the energy transmittal circuit will now be described. Point A on the pressure-enthalpy diagram shown in FIG. 5 corresponds to a point within the third radiator pipe 72 prior to expansion of the thermal transfer medium. Enthalpy theoretically stays constant as pressure is reduced when the thermal transfer medium passes through expansion valve 74 to a point B in fourth radiator pipe 76. A certain amount of environmental heat may be added at constant pressure via heat pump 58 and heat exchanger 60, thereby increasing the enthalpy of thermal transfer medium from point B to point C. Stored solar heat is then added to the thermal transfer medium at constant pressure via heat exchanger 62 to a point D on the pressure-enthalpy diagram in FIG. 5. The thermal transfer medium is then isentropically compressed via compressor 66 into a superheated vaporized condition, which is depicted as point E in FIG. 5. As the superheated vapor enters the space defined in radiation tube 38, a certain amount of heat is radiated and reflected skywardly by concentrator 26 before liquefaction occurs. Because this occurs at constant pressure within a fixed volume, the temperature of the fluid is also constant, thus ensuring that radiation is relatively constant over the entire length of tube 36. The thermal transfer medium is then returned to the state depicted at point A in FIG. 5.

Figure 6:
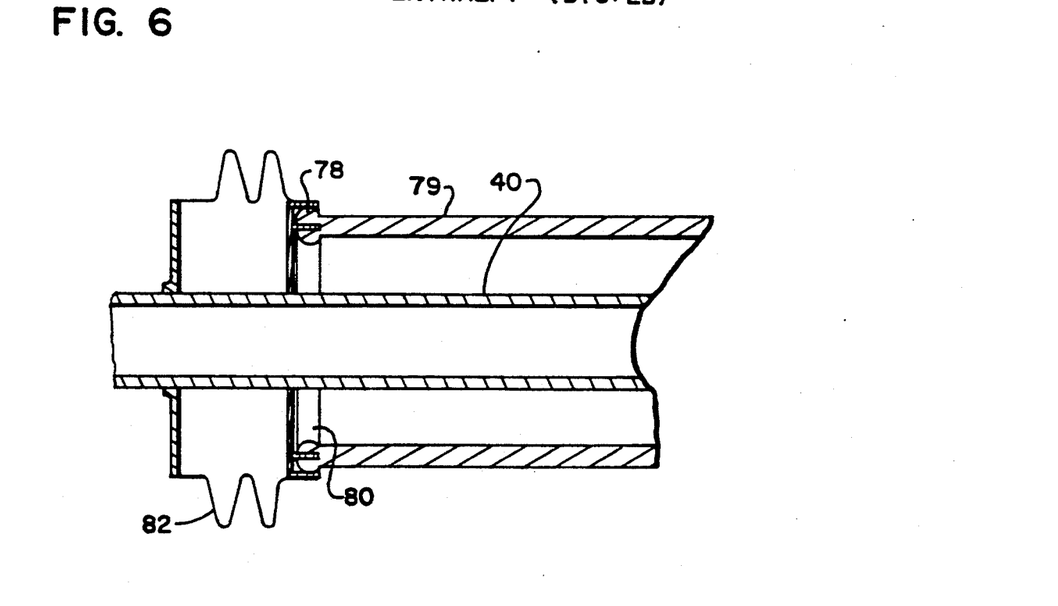
FIG. 6 is a fragmentary cross-sectional view of a specific collector arrangement optionally used for the reduction of convective heat losses from solar energy collector apparatus.

Referring now to FIG. 6, radiation collection tube 36 may alternatively be constructed as follows: In the embodiments incorporating separate tubes for heat collection and reradiation, an outer tube 79 is formed of a transparent thermally resistant ceramic material such as pyrex, and has a beaded end rim 78 formed thereon. Collector tube 40 is preferably formed of steel and has a black chrome finish for maximum heat absorption and radiation characteristics. It is anticipated that both outer tube 79 and collector tube 40 would be used in sections of typically 20 feet in length, and the space between the tubes would be sealed and evacuated. The purpose of transparent tube 79 is to reduce convective heat losses from tube 40 during the heat collection process, which will represent the dominant use of the apparatus in terms of operating time. Since the tubes 79, 40 have different thermal expansion coefficients, and since the tubes must be mechanically joined to each other in order to form a sealed enclosure, it is necessary to provide a sealing arrangement which compensates for differences in thermal expansion. To this end, the beaded rim 78 of outer tube 79 is fitted into a cup-like member 80 which is formed of a material having a very low coefficient of thermal expansion. For example, cup 80 may be formed from a steel alloy containing cobalt such as Kovar. A resilient bellows 82 is provided to compensate for the differential linear expansion of tubes 79, 40. Cup 80 provides the thermal expansion transition between transparent tube 79 at bead 78 and the bellows 82, bellows 82 being formed of relatively high thermal expansion coefficient material such as stainless steel. The hermetic seal between cup 80 and tube 79 is a version of the so-called Housekeeper seal, a sealing method familiar to those skilled in the art of joining glass to metals.

Figure 7:
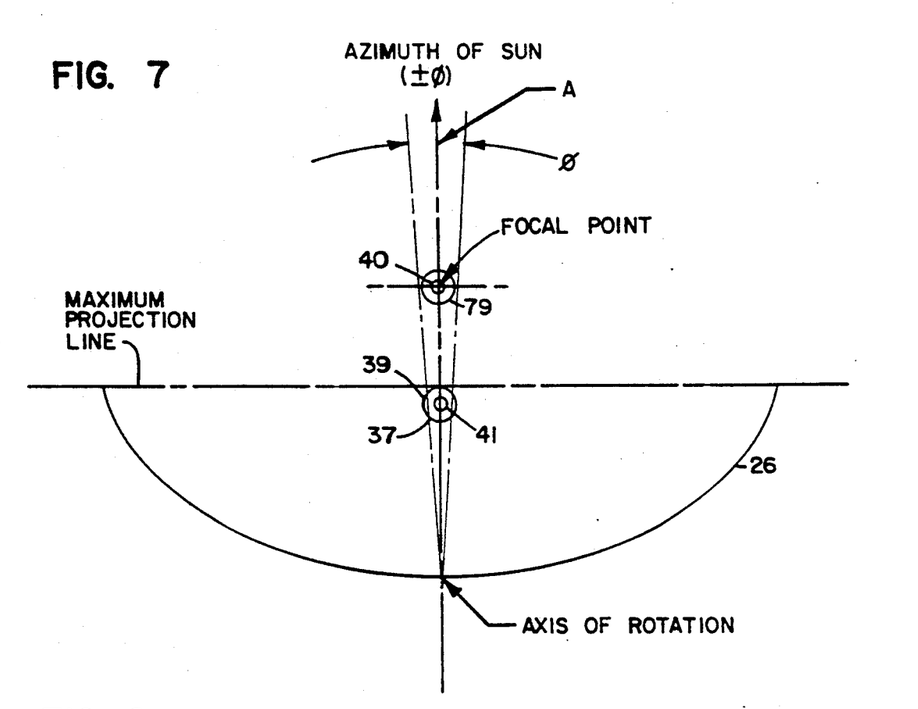
FIG. 7 is a schematic cross-sectional view of a collector arrangement showing the specific location of collector and reradiation tubes for embodiments incorporating separate collector and reradiation apparatus.

The embodiment of FIG. 6 utilizes a single channel collector tube 40, which is located at the focal point of the concentrator 26 and used exclusively for heat collection. An auxiliary piping arrangement having a partitioned tube 37 with inner and outer tubes 39 and 41 respectively is provided specifically for the reradiation process. Tube 37 is located in a fixed position parallel to concentrator 26 along it's length and with it's axis on a line running from the center of concentrator 26 through its focal point, as illustrated in FIG. 7. When it is deemed necessary or desirable to reradiate energy into space for localized environmental cooling the concentrator assembly 26 is rotated vertically skyward. Tube 41 is connected through diverting valves which channel fluid from storage reservoir 90 through tube 41 and block the flow of this fluid from tube 40. Outer tube 39 is connected to serve as a channel for fluid carrying environmental heat which has been gathered by heat pump 108 and connecting pipes 110, 112. Circulating stored solar heat through tube 41 while at the same time circulating fluid carrying environmental heat through tube 39 will increase the temperature of the environmental fluid, shifting its radiation frequencies to shorter wavelengths which are less affected by the absorption of gases such as carbon dioxide than is the case for radiation from the relatively low temperature earth. By positioning Tube 37 on the concentrator side and directly in line with tube 40, tube 37 does not interfere with the path of solar radiation during the collection process. In addition, by locating tube 37 short of the focal point of concentrator 26 and below the line marked "maximum projection" on FIG. 7, it is assured that all radiation from tube 37 will be directed away from the earth and into space.

Referring again to FIGS. 4 and 12, a second mode of operation of the apparatus will now be discussed. Through an electronic arrangement which would be known to those skilled in the art, the tracking and control system 32 may be switched into a second operational mode which provides an offset or lag in the manner that the concentrator 26 follows the sun. This second mode would be inactive during periods of solar collection, but may be enabled when it is desired to reradiate heat to space. As may be seen in FIG. 12, the effect of the second operational mode would be to offset the direction in which concentrator 26 is focused from the azimuth of the sun by an amount equal to an angle $\phi$. The angle is determined by the arc segment A which is subtended by the cross section of the outer tube 79 of the collector element. In this second operational mode, the effect of the offset is to de-focus the parabolic concentrator, so that all radiation being received from the sun would be directly reradiated without going through the process of converting the radiation to heat, and then later reradiating the heat back into space. In this way, all radiation intercepted by the concentrator is directly reradiated at precisely the same frequencies that it entered the concentrator. Since this radiation has already passed through the atmosphere unimpeded, it will travel back through the atmosphere unimpeded. Thus, 100 percent of the radiation intercepted by the concentrator is reradiated.

Figure 12:
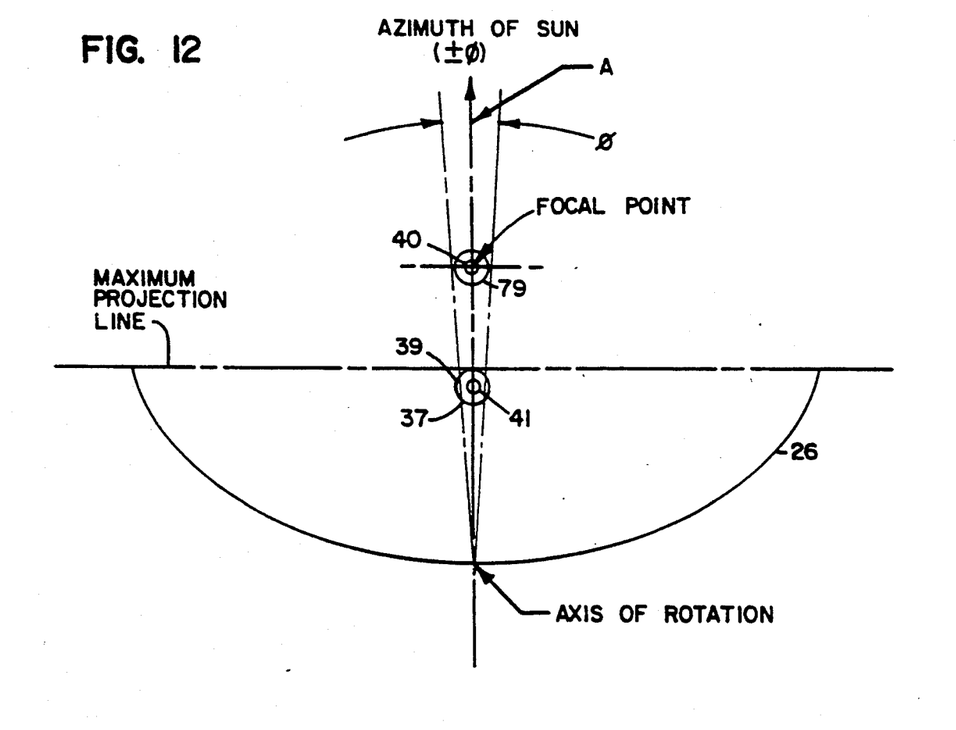
FIG. 12 is a schematic cross-sectional view similar to FIG. 7, illustrating a second preferred mode of operation according to the invention.

A greater amount of offset than angle $\phi$ may also be provided by the tracking and control system 32, however the best results are expected to occur when the focused beam is aimed to just miss the outer tube 79 of the collector, which is achieved by limiting the degree of offset to angle $\phi$. Angle $\phi$, then, is equal to the angle formed by lines drawn tangent to the circular cross section of the collector structure from the center of rotation of the collector structure.

Figure 8:
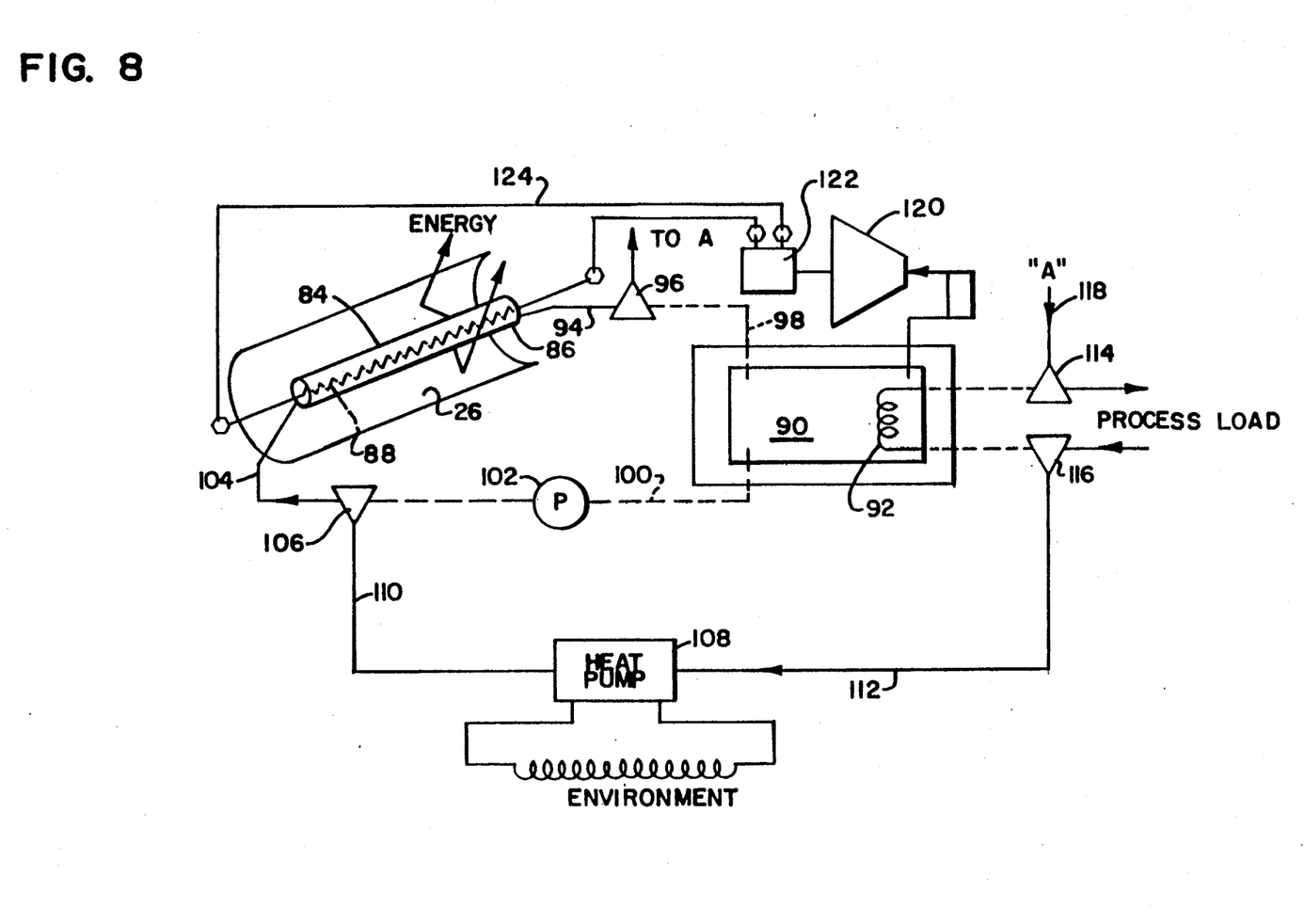
FIG. 8 is a schematic diagram of a solar energy collector and reradiation apparatus constructed according to a second embodiment of the invention.

Referring now to FIG. 8, a second embodiment of a solar energy collector and reradiation apparatus according to the invention will now be described. A radiation tube 84, preferably formed of steel and having a black chrome finish for maximum heat absorption and radiation characteristics, has an electric heating element 88 disposed therein and along its axis. Tube 84 extends through the collection domain defined in parabolic concentrator 26, in the manner discussed above with reference to the embodiment of FIG. 4. A heat storage reservoir 90 is constructed as an insulated high temperature storage tank and is provided with a heat exchanger 92 formed therein, as is shown in FIG. 8. An energy transferring circuit includes a first pipe 94 which leads from radiation tube 84 to valve 96, a second pipe 104 which leads from a diverting valve 106 to the radiation tube 84, a pump 102 for circulating fluid between radiation tube 84 and heat storage reservoir 90, a reservoir take-off pipe 100 leading from pump 102 to reservoir 90 and a reservoir supply pipe 98 which leads from valve 96 to reservoir 90.

When it is desired to heat the fluid in reservoir 90, pump 102 draws fluid via pipe 100, and diverting valve 106 channels the fluid through pipe 104 into radiation tube 84. The fluid then passes through pipe 94 and is channeled through reservoir supply pipe 98 by diverting valve 96. If it is desired to commercially utilize the thermal energy collected in reservoir 90, diverting valves 114, 116 are turned so that flow from pipes 118, 112 is blocked. Heat circulation to PROCESS LOAD is channeled through coil 92, which extracts heat from reservoir 90, as shown in FIG. 8.

When it is deemed necessary or desirable to reradiate energy into space to effect localized environmental cooling, a turbine generator 120 is actuated to supply electric current to heating element 88 via an electric circuit 124. Turbine generator 120 is preferably powered by the thermal energy in heat storage reservoir 90, as it shown schematically in FIG. 8. Electric power from this turbine is also preferably used to drive circulating pump 102, and to provide electricity for other commercial or industrial purposes when it is not necessary to reradiate energy into space. With diverting valve 106 positioned to connect pipes 110, 104 and with diverting valve 96 positioned to connect pipes 94, 118, environmental heat is extracted from the environment by heat pump 108, is circulated through radiation tube 84 via pipes 110, 104 wherein its temperature is raised to some elevated temperature such as 600° F. by heating element 88. With connector 26 pointed skywardly, radiation of heat from the surface of collector 84 into outer space thus occurs at wavelengths which are less affected by gases such as carbon dioxide than would normally be the case, as is graphically shown in FIG. 3. Since the fluid temperature at the exit of tube 84 will be at a temperature significantly above the temperature of the environment even after heat has been radiated to outer space, it is necessary to further reduce its temperature in preparation for flow back through the heat pump as part of the process of extracting environmental heat. Thus, the fluid flowing into pipe 94 from tube 84 is channeled by diverting valves 96, 114 and 116 to return to the heat pump 108 via the PROCESS LOAD shown in FIG. 8, thus lowering its temperature through useful work as process heat, and enabling the fluid, thus cooled, to perform as heat absorbing medium at heat pump 108. This embodiment has added flexibility for continued electrical heating of fluid in tube 84 even when the energy stored in reservoir 90 is exhausted or insufficient for the task, since heating element 88, pump 102 and heat pump 108 can be powered from an external source. This external source may be electricity generated by wind turbines, hydroelectric power, or as a last resort, from fossil-fuel powered electricity generating facilities remote from the localized region being cooled.

Figure 9:
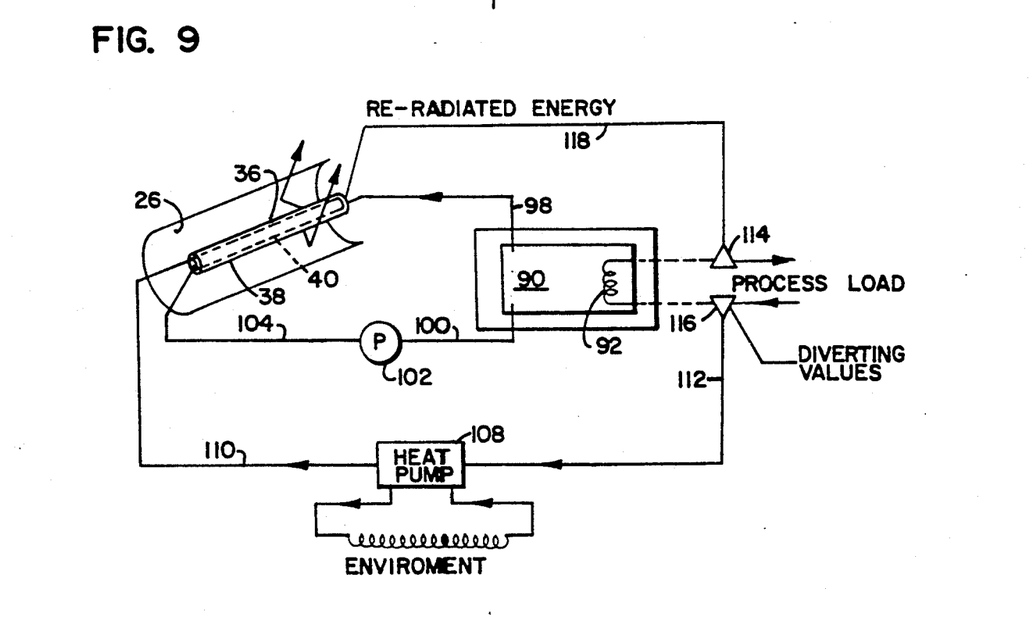
FIG. 9 is a schematic diagram of a solar energy collector and reradiation apparatus constructed according to a third embodiment of the invention.

Referring now to FIG. 9, a third preferred embodiment of a solar energy collector and reradiation apparatus according to the invention will now be described. A radiation tube 36 preferably formed of steel and having a black chrome finish for maximum heat absorption and radiation characteristics, is partitioned as described for radiation tube 36 shown in FIG. 4. Circulation of fluid used for gathering environmental heat is channeled through the outer tube 38 of radiation tube 36. Rather than being heated by an electric heating element as described for the embodiment illustrated in FIG. 7, however, the fluid carrying environmental heat is raised in temperature by fluid drawn from storage reservoir 90 and circulated through inner tube 40 of radiation tube 36. Except for the means of imposing a high temperature on the environmental fluid, the operation of this embodiment is identical to that described in connection with FIG. 7. When it is deemed necessary or desirable to reradiate energy into space to effect localized environmental cooling, concentrator 26 is pointed vertically skyward, pump 102 is operated to circulate stored solar energy through tube 40, and heat pump 108 is operated to circulate fluid carrying heat gathered from the environment through tube 38. Tube 36 thus serves as a heat exchanger through which the radiation wavelength of the fluid carrying environmental heat is modified to more effectively avoid the absorption bands of gases such as carbon dioxide in the atmosphere and thus increase the efficiency of energy radiation to space.

The structures illustrated in FIGS. 8 and 9, and detailed in the above text, have for simplicity been described with a collector tube arrangement located at the focal point of concentrator 26 which has no protection against convective heat losses. It is to be noted that each of these arrangements can be alternatively provided with the convective loss protection illustrated in FIG. 6 and detailed in the above text. In this case, the auxiliary tubing arrangement illustrated in FIG. 7 and detailed in the pertinent text above would be used for reradiation purposes, since the pyrex tube utilized for protection from convective losses is not capable of transmitting radiation at the frequencies most useful for reradiation of energy to space.

Figure 10:
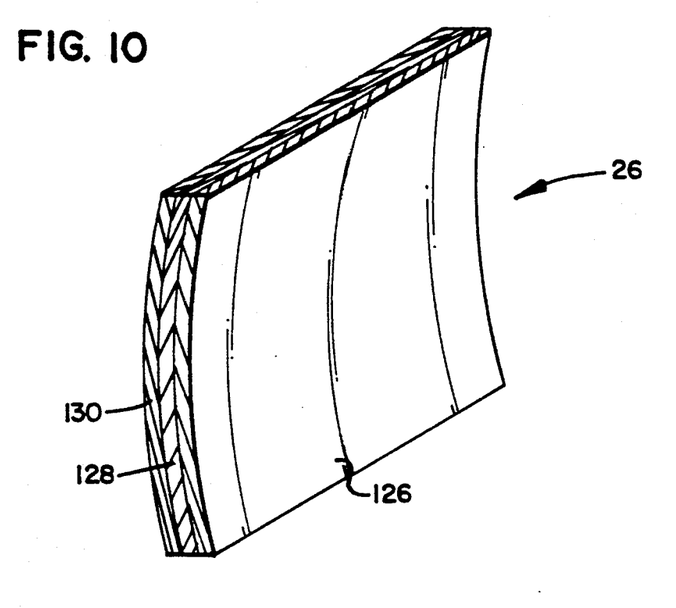
FIG. 10 is a fragmentary cross-sectional view of a parabolic concentrator which may be used in conjunction with the various embodiments of the invention.

Referring now to FIG. 10, a parabolic concentrator 26 according to any of the above-described embodiments of the invention may be provided with an inner transparent protective layer 126, a reflective layer 128, and an outer protective layer 130. In the first embodiment shown in FIG. 10, outer protective layer 130 is preferably a rigid support member which is formed from glass, plastic, aluminum, steel or equivalent structural material. In the embodiment of FIG. 10, inner transparent protective layer 126 is preferably formed of silicon oxide, deposited to a thickness which is less than any of the wavelengths desired to be reflected from reflective layer 128. Layer 126 may also be formed from a film of synthetic diamond. Reflective layer 128 is preferably aluminum or silver, vacuum deposited on the inner surface of outer support member 130. In the event that outer support member 130 is formed from aluminum, reflective layer 128 may consist of polished inner surface of member 130.

Figure 11:
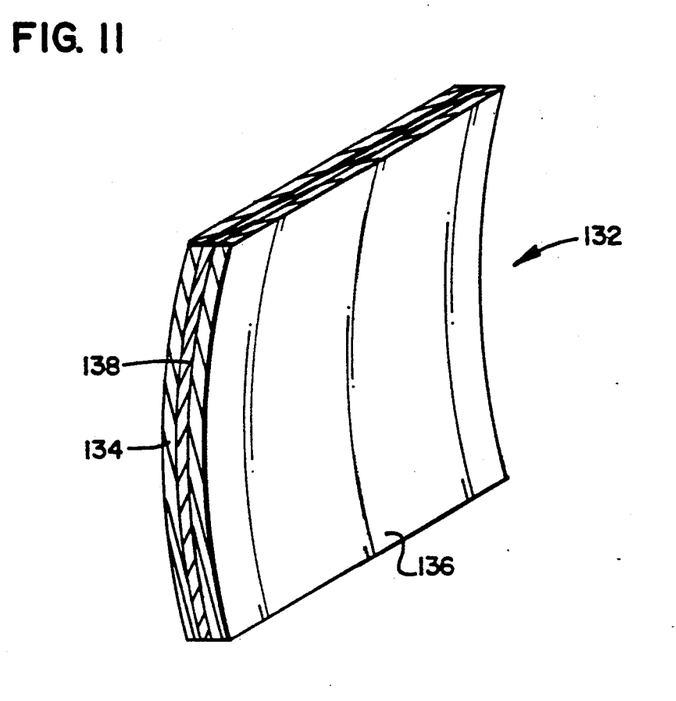
FIG. 11 is a fragmentary cross-sectional view of a concentrator arrangement which may be used as an alternative to that of FIG. 8.

FIG. 11 illustrates a second preferred embodiment 132 of a parabolic concentrator. In this embodiment, a rigid parabolic reflector 134 is provided with a reflective layer 138 which may be applied to surface 134 by a well-known process such as chemical deposition, vacuum deposition or sputtering. Reflective layer 138 is preferably formed of silver or polished aluminum, and is provided with a plastic film coating 136 to protect reflective layer 138 against oxidation and impurities. The plastic film coating is thermoplastic and has high transparency in those regions of the radiation spectrum from about 0.4 to 14 micrometers that are important to the transmission of radiation through the atmosphere for collection of solar heat and reradiation of heat back to space. The material also has a low coefficient of friction, which reduces the amount of material that would stick to its surface and thus absorb or scatter incoming radiation. Plastic materials which may be used for protection of reflective layer 138 include thin films of polytetrafluoroethylene, polyethylene, polymethylmethacrylate, and a polymer of trifluorochloroethylene, which are available commercially as Teflon, Lucite, Plexiglass and Kel-F respectively.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:
1. A solar energy collector and reradiation apparatus for use in energy production and climate control comprising:
   means for storing energy within a storage media without allowing significant energy to escape to the environment;

means for concentrating solar radiation into said storage media at a temperature above approximately 400 degrees Kelvin;

means for transferring energy from the concentrating means to said storing means;

means for radiating energy skywardly; and means for transmitting energy from said storing means to said radiating means, whereby solar energy may be reradiated into space at wavelengths principally between 2 and 12 micrometers and thus is less likely to be absorbed by the atmosphere than would naturally occur, thus permitting localized cooling and climate control.

2. Apparatus according to claim 1, further comprising means for extracting energy from the environment; and means for providing energy so extracted to said radiating means.

3. Apparatus according to claim 1, wherein said storing means comprises an insulated high temperature storage tank.

4. Apparatus according to claim 1, wherein said concentrating means comprises a reflective concentrator.

5. Apparatus according to claim 4, wherein said concentrator comprises an inner transparent protective layer, a reflective layer which is adhered to an outer surface of said protective layer, and an outer protective layer which is adhered to an outer surface of said reflective layer.

6. Apparatus according to claim 5, wherein said transparent inner protective layer consists of a material having high transmission characteristics over the range of wavelengths from 0.3 micrometers to 14 micrometers.

7. Apparatus according to claim 5, wherein said transparent inner protective layer consists of plastic materials selected from the group consisting essentially of polytetrafluoroethylene, polymethylmethacrylate, polyethylene and trifluorochloroethylene.

8. Apparatus according to claim 5, wherein said transparent inner protective layer consists essentially of silicon oxide applied with a uniform thickness which is less than the shortest wavelength of the radiation desired to be transmitted.

9. Apparatus according to claim 8, wherein said transparent inner protective layer has a uniform thickness of 0.125 micrometers.

10. Apparatus according to claim 5, wherein said transparent inner protective layer comprises a film of synthetic diamond.

11. Apparatus according to claim 2, wherein said transferring means comprising a collector tube which extends through the collection domain, and means for circulating a heat transfer medium from said storing means, through said collector tube and back into said storing means.

12. Apparatus according to claim 11, wherein said collector tube is partitioned to provide two separate channels for fluid flow through the collection domain.

13. Apparatus according to claim 12, wherein one channel of said partitioned collection tube is part of a path for circulating a heat transfer medium from said storing means through said tube, and the second channel of the partitioned collector tube is part of a path for circulating heat extracted from the environment by said extracting means therethrough.

14. Apparatus according to claim 1, wherein said radiating means includes an electric heating element.

15. Apparatus according to claim 14, wherein said transmitting means includes means for generating electricity entirely from energy in said storing means, and means for supplying the electricity to said electric heating element.

16. Apparatus according to claim 1, wherein said concentrating means and said radiating means include a common partitioned collector tube located at the focal point of the concentrating reflector.

17. Apparatus according to claim 1, wherein said concentrating means includes a collector tube located at a focal point of said concentrating means, sand said radiating means includes a separate tube which is not located at the focal point.

18. A method for collecting and reradiating solar energy for purposes of energy production and localized climate control, comprising:
(a) concentrating solar radiation into a collection space at a temperature above approximately 400 degrees Kelvin;
(b) transferring energy from the collection space to a storing means without allowing significant energy to escape to the environment during transfer or storage;
(c) transmitting energy from the storing means to a radiating means; and
(d) radiating the transmitted energy skywardly, whereby solar energy is reradiated into space at wavelengths principally between 2 and 12 micrometers and thus is less likely to be absorbed by the atmosphere than would naturally occur, thus permitting localized cooling and climate control.

19. A method according to claim 18, further comprising the step of:
(c) (1) adding energy extracted from the environment to that which is transmitted from the storing means in step (c), whereby energy radiated in step (d) includes both energy extracted directly from the environment and solar energy that has been previously collected and stored.

* * * * *